United States Patent [19]
Conner et al.

[11] 3,891,932
[45] June 24, 1975

[54] METHOD AND APPARATUS FOR SENSING AND CONTROLLING MOTION OF A MOVABLE MEMBER

[75] Inventors: Charles C. Conner; William R. Price, both of Portland, Oreg.

[73] Assignee: William R. Price, Portland, Oreg.

[22] Filed: July 19, 1973

[21] Appl. No.: 380,679

[52] U.S. Cl. ............ 328/147; 307/235 R; 307/308; 328/115
[51] Int. Cl. ........................................... H03k 5/20
[58] Field of Search......... 307/235 R, 308; 328/115, 328/146.8; 324/161, 169; 74/865

[56] References Cited
UNITED STATES PATENTS
2,927,475   3/1960   Burckhardt................... 74/865 R X
3,234,811   2/1966   Fritz et al. ......................... 74/865

*Primary Examiner*—John Zazworsky
*Attorney, Agent, or Firm*—Oliver D. Olson

[57] ABSTRACT

A transducer, capable of converting noise signals to electrical voltage signals, is mounted in contact with a movable member and the electrical voltage output thereof is converted to a current function which then is converted to a DC signal which is directly proportional to the noise generated from the movable member. This DC signal then is compared with a generated, predetermined control signal that represents the desired motion at which an event can take place, such as the shifting of a vehicle transmission between forward and reverse conditions. When the DC signal matches the control signal the event can occur, either automatically or by manual manipulation.

8 Claims, 18 Drawing Figures

PATENTED JUN 24 1975 3,891,935

SHEET 1

METHOD AND APPARATUS FOR SENSING AND CONTROLLING MOTION OF A MOVABLE MEMBER

BACKGROUND OF THE INVENTION

This invention relates to motion sensing, and more particularly to novel method and apparatus by which the motion of a movable member is utilized to control one or more events associated with said movable member.

There are many industrial, commercial and other activities in which it is desirable to control the movement of a movable member. Exemplary of such activities is the operation of a lift truck in the transport of objects from one location to another. Because of the desire to achieve maximum productivity from the lift truck, it has become a general practice among operators thereof to utilize the transmission as a braking mechanism, by shifting the transmission to the opposite driving direction before the speed of movement of the vehicle has been reduced to an appropriate magnitude. The result of such operation is reflected adversely in the excessive costs incident to frequent breakdown of the vehicle, generally requiring replacement or repair of the transmission, and the loss of productivity from the vehicle during the time required for such replacement or repair.

Another example of an activity involving the control of movement of a movable member, is the maintenance of a predetermined movement of a conveyor, for example for the continuous delivery of specified numbers or amounts of objects or materials to subsequent processing stations.

Motion sensing and controlling devices for the foregoing and other activities have been provided heretofore. However, they are generally characterized by excessive degrees of inaccuracies, lack of reproducibility, and complex constructions reflecting excessive costs of manufacture, maintenance and repair.

SUMMARY OF THE INVENTION

In its basic concept, the method and apparatus of this invention utilizes a movable member to generate noise signals which are converted to proportional direct current signals which then are compared with generated, predetermined control signals which, when matched with the former signals, allows a motion altering and/or other event to occur.

It is by virtue of the foregoing basic concept that the principal objective of this invention is achieved; namely, to overcome the afore-mentioned disadvantages of prior motion sensing and controlling devices.

Another important object of this invention is the provision of method and apparatus of the class described which accommodate the control of motion precisely over a wide range of motion conditions.

A further important object of this invention is the provision of method and apparatus of the class described which are versatile in their applicability to the sensing and control of motions and other events associated with a wide variety of types of movable members.

The foregoing and other objects and advantages of this invention will appear from the following detailed description, taken in connection with the accompanying drawings of preferred embodiments.

DESCRIPTION OF THE PREFERRED EMBODIMENTS

Figure 1:
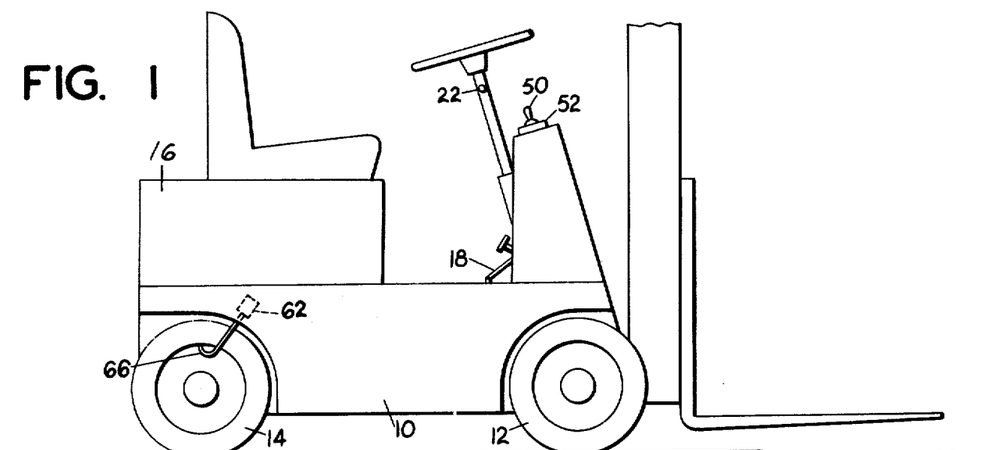
FIG. 1 is a fragmentary view in side elevation of a lift truck incorporated therein motion sensing and controlling apparatus embodying the features of this invention.
Figure 7:
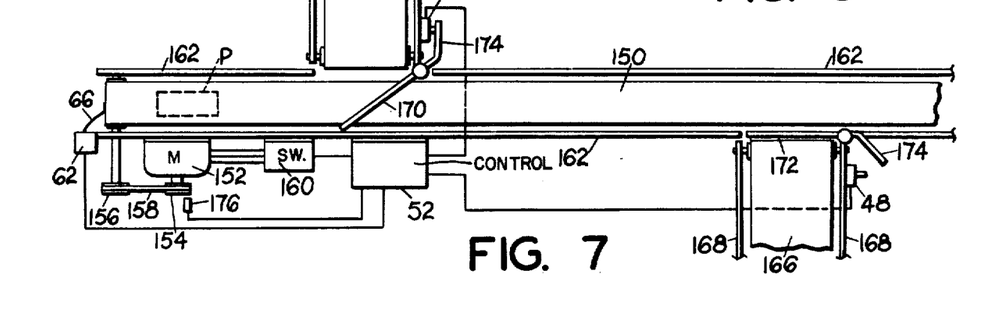
FIG. 7 is a fragmentary plan view of a conveyor system incorporating therein motion sensing and controlling apparatus embodying features of this invention.

Although the method and apparatus of this invention have wide applicability of use, as mentioned hereinbefore, they are described herein with reference to the operation of a lift truck as illustrated in FIG. 1 and of a conveyor system as illustrated in FIG. 7. Referring first to the embodiment of FIG. 1, the lift truck includes a frame 10 supported by a pair of power driven front wheels 12 and one or a pair of unpowered rear wheels 14. In this application of the present invention, the rear wheel or wheels are not provided with braking mechanism. However, in the event the apparatus of this invention is to be utilized with a vehicle in which all of the supporting wheels are provided with braking mechanism, an extra ground engaging idler wheel may be provided, as will become apparent hereinafter.

Figures 2, 3A, 3B, 3C, 4, 5:
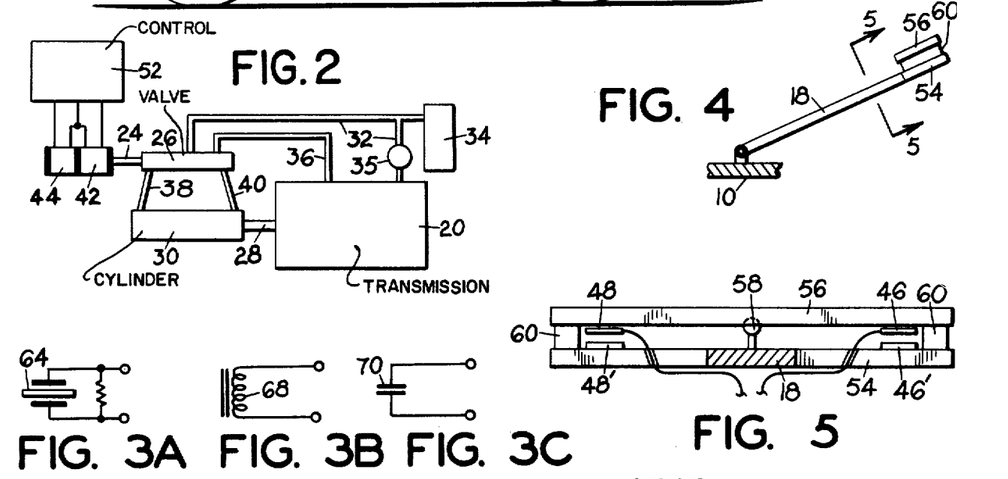
FIG. 2 is a schematic diagram of hydraulic and electrical circuitry associated with the lift truck of FIG. 1 for sensing and controlling the motion thereof.
FIGS. 3a, 3b and 3c are schematic electrical diagrams illustrating alternative forms of transducers suitable for use in the apparatus of this invention.
FIG. 4 is a fragmentary view in side elevation of an accelerator pedal for use on the lift truck of FIG. 1 in conjunction with the apparatus of this invention.
FIG. 5 is a sectional view taken on the line 5—5 in FIG. 4.

The lift truck is provided with an internal combustion or other suitable type of drive engine or motor confined with a housing 16. The speed of the engine is controlled by an accelerator pedal 18. The output shaft of the engine is coupled in conventional manner to the front drive wheels 12 through a power shift transmission 20 (FIG. 2). The transmission ordinarily is controlled by a shift lever 22 mounted on the steering column. The lever is coupled through a linkage assembly to the projecting stem 24 of an hydraulic control valve 26 which functions to control the longitudinal extension and retraction of the piston rod 28 of an hydraulic shift cylinder 30. The cylinder functions to shift the transmission 20 to forward, neutral and reverse positions.

Figure 9:
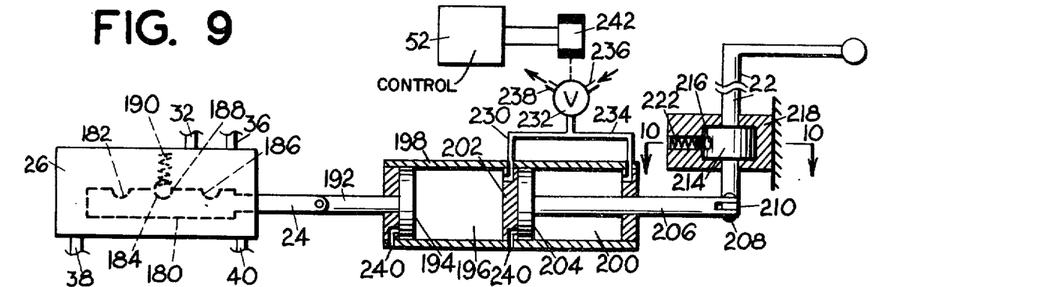
FIG. 9 is a fragmentary foreshortened view in side elevation of a modified form of fluid pressure control usable with the lift truck of FIG. 1.

Since all of the foregoing is well known and conventional, it is not illustrated in detail. However, for later reference, it is to be pointed out here that the control valve 26, illustrated in greater detail in FIG. 9, is of the conventional spool type in which the forward, neutral and reverse positions are located by a detent assembly of three annular grooves in the valve spool arranged selectively to receive a spring-loaded ball mounted retractably in the valve body.

The embodiment of this invention illustrated in FIG. 1 functions by sensing the speed of motion of the lift truck to prevent shifting of the transmission between forward and reverse positions until the speed of the lift truck has been reduced to a predetermined magnitude. For this purpose the linkage connection between the shift lever 22 and the projecting stem 24 of the control valve 26 is uncoupled, and said stem is coupled to the armature of a spring-loaded, center-neutral, push-pull solenoid (FIG. 2). The conventional transmission assembly remains unchanged. Thus, the outlet of the hydraulic pressure supply of the power shift transmission 20 is connected through conduit 32 to the inlet of the control valve 26. An accumulator tank 34 may communicate with the pressure conduit 32, for the storage of a supply of fluid pressure. A check valve 35 in line 32 is interposed between the tank 34 and pressure source 20, as will be understood. The exhaust port of the valve is connected through a conduit 36 to the sump of the hydraulic pressure supply, and the forward and reverse outlet ports of the valve are connected through conduits 38 and 40 to the opposite ends of the power shift cylinder 30. The projecting piston rod 28 of the cylinder is coupled in conventional manner to the transmission.

The double acting solenoid functions to control operation of the control valve 26. It includes a pair of inductance coils 42 and 44 and a common movable armature coupled to the valve stem 24. Selection of forward or reverse drive for the lift truck is made manually by the operator to move switch contacts 46 and 48 (FIG. 6) to the alternate positions of forward and reverse drive. Manual control for the switch contacts may be provided in a variety of ways. For example, the shift lever 22 may be coupled in any desired manner to the switch contacts, to provide selection by customary manipulation of the shift lever, it being remembered that the shift lever is uncoupled from the control valve 26. Alternatively, manipulation of the switch contacts may be provided by a switch lever 50 mounted on a control box 52 which houses the electronic circuitry of FIG. 6. The housing may be mounted on the dash panel of the lift truck for convenient access to the operator.

A preferred arrangement for operator control of the switch contacts is illustrated in FIGS. 4 and 5 of the drawings. The accelerator pedal 18 is provided at its forward end with oppositely directed lateral extensions 54. A transversely elongated rocker plate 56 overlies the lateral extensions in spaced relation thereto and is supported centrally for pivotal movement on the longitudinal axis of the pedal 18 by such means as an elongated ball and socket assembly 58, or a plurality of longitudinally spaced ball and socket units. Interposed between the rocker plate and the underlying lateral extensions, adjacent the opposite ends thereof, are resilient members 60. These function to maintain the rocker plate substantially parallel to the underlying lateral extensions, but allows the rocker plate to pivot about the axis of the central pivot, in either clockwise or counterclockwise directions (FIG. 5). The resilient members may be in the form of coil or leaf springs, or other suitable means. In the embodiment illustrated, they are provided by blocks of sponge or other suitably resilient forms of rubber.

Adjacent the opposite ends of the assembly of lateral extensions 54 and overlying rocker plate 56 are reed switches 46 and 48 cooperating with permanent magnets 46' and 48'. The reed switches are shown to be supported on the underside of the rocker plate, while the associated magnets are supported on the upper face of the lateral extensions. These positions of mounting may be reversed, as will be apparent.

In the normal rest position of the rocker plate, substantially parallel to the underlying lateral extensions, the pair of reed switches are spaced from the associated magnets. In this position the switch contacts of the reed switches are in the full line positions illustrated in FIG. 6. However, when the operator rocks his foot on the accelerator pedal to pivot the rocker plate counterclockwise about the central pivot 58, the left hand reed switch 48 is moved closer to its associated magnet. This results in movement of that reed switch contact to the broken line position illustrated in FIG. 6 and consequent selection of reverse drive of the lift truck. In similar manner, when the operator rocks his foot on the accellerator pedal to pivot the rocker plate clockwise about the central pivot, the right hand reed switch 46 is moved toward its associated magnet, with consequent switching of that contact to the broken line position illustrated in FIG. 6, for selection of forward drive of the lift truck.

The foregoing manipulations merely provide initial selection of drive direction by the operator. However, ultimate activation of the drive system in the selected direction is not achieved until motion of the vehicle in the opposite direction has been reduced to a predetermined magnitude, whereupon the circuitry illustrated in FIG. 6 operates automatically to effect shifting of the drive direction.

Figure 6:
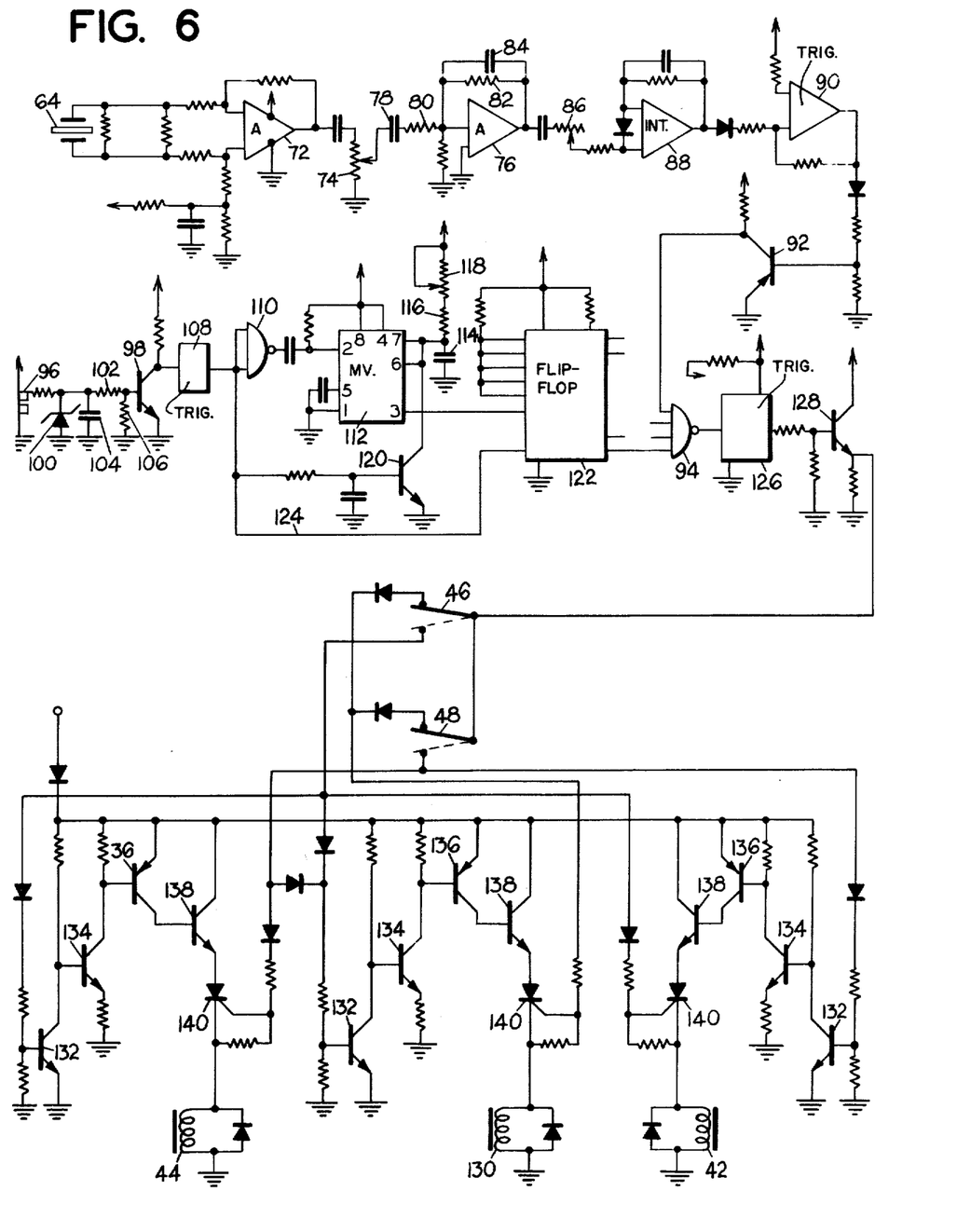
FIG. 6 is a schematic diagram of electrical circuitry for use in the apparatus of this invention.

The motion sensing and control system of FIG. 6 utilizes a transducer 62 (FIG. 1) of the type which converts noise signals into corresponding alternating current voltage signals. Exemplary forms of such transducers are illustrated schematically in FIGS. 3a, 3b and 3c. In FIGS. 3a and 6 the transducer is in the form of a piezoelectric crystal 64. One such transducer is of the ceramic type available commercially as Astetic model 89T. It is connected to one end of an elongated metal probe 66 the opposite end of which is disposed in sliding contact with one of the idler wheels 14 of the lift truck, as illustrated in FIG. 1. FIG. 3b illustrates an inductive transducer 68, while FIG. 3c illustrates a capacitive transducer 70. These may be operated in a variety of ways well known to those in the art.

In all instances, the noise signals generated by the sliding contact of the probe 66 on the idler wheel 14 are converted by the transducer 62 to corresponding alternating current voltage signals. However, because of the erratic nature of such output voltages, considerable expense is involved in providing circuitry to reduce such problems to realistic values and to identify therefrom those noise signals related only to the transducer. Accordingly, it is an important feature of this invention that the alternating current voltage signal output from the transducer is converted to current. To this end, the alternating current voltage signals from the transducer are passed through line load resistance to convert them to currents, in order to minimize the effects of noise induced into the line by extraneous sources. These currents are amplified by the balanced line operational amplifier 72, for example of the Norton type, to establish an amplified current output regardless of the type of input device employed. A sensitivity control potentiometer 74 provides coarse adjustment by which a desired level of said amplified current is selected to perform the necessary subsequent functions.

The selected level of amplified current then is passed through an inverter amplifier 76. Capacitance 78 and resistance 80 provide an RC function which removes a desired level of low frequency noise, and resistance 82 and capacitance 84 provide a high frequency feed back to filter out a desired level of high frequency noise.

The substantially constant output from the inverter then is coupled through a speed adjustment rheostat 86 to a direct current integrator 88. The speed adjustment functions as a fine calibration for setting the motion sensing on the lift truck between a dead stop condition and a desired speed, for example 50 feet per second. The direct current integrator functions to convert the alternating sine wave output from the inverter amplifier 76 to a direct current output level which is directly proportional to the noise generated in the selected frequency spectrum of the transducer.

The direct current output from the integrator is coupled to a Schmitt trigger circuit 90 characterized by having a very broad hysteresis function. For example, it is turned on at approximately 8 volts and is turned off at approximately 2 volts. The square wave output from the Schmitt trigger is coupled to an interface transistor invertor 92. This inverter performs the dual function of reducing the voltage level to a value, for example 5 volts, suitable for use in the subsequent circuitry, and also of inverting the square wave signal for application to a nand gate 94. This gate preferably is of the multiple input type which affords the introduction of any desired number of events to be controlled. Among these may be such conditions as engine water and oil temperature, oil pressure, air cooling fan speed and others. Suitable transducers are available for these purposes, as will be understood. The nand gate illustrated functions to provide a low level output if and only if all of the inputs to the gate are at high level. The reverse function, i.e. high level output with all low level inputs, may be provided by including an additional nand gate, or inverter.

Means is provided for applying to the nand gate predetermined control signals with which the aforementioned input signals to the nand gate are to be compared. In the embodiment illustrated, the control signal generator includes the ignition points 96 of a vehicle engine. The high voltage point is coupled to an input transistor 98 through a protective zener diode 100, an RC time constant provided by resistance 102 and capacitance 104 to minimize point bounce problems, and a voltage divider provided by resistances 102 and 106 to prevent overbiasing of the transistor.

The output of the input transistor 98 is a pulse of improved shape, and it is coupled to an integrated Schmitt trigger circuit 108 having a much narrower hysteresis function than the Schmitt trigger circuit 90 previously described. The square wave output signal of the Schmitt trigger circuit is coupled through an inverter nand gate 110 to the trigger input terminal 2 of a monostable multivibrator integrated circuit 112. For purposes of this illustration, the circuit 112 is provided by integrated circuit Model No. NE 555 manufactured by Signetics, Inc., and the terminal numbers correspond with those of the manufacturer. The configuration of this monostable multivibrator is such that it is stable in one state only and unstable in the other. Thus, a negative going input trigger pulse at terminal 2 produces a positive output control pulse at terminal 3 having a duration determined by the externally provided time constant of an energy storage network formed of capacitance 114, resistance 116 and potentiometer resistance 118. This network is connected to the threshold signal input terminal 6 and the discharge signal output terminal 7. When this time constant runs out, the capacitance has charged up to a level that triggers the multivibrator back to the zero output condition.

Simultaneously, the square wave output of the Schmitt trigger circuit 108 is applied to the base of discharge transistor 120 which functions to discharge the timing capacitor 114. This timing capacitor establishes the period of time in which the output of the monostable multivibrator is high. Thus, if the capacitor discharges before the output has dropped to zero, and the capacitor continues to discharge, the output of the multivibrator will remain in its positive condition. However, if the pulse rate coming from the ignition points 96 is faster than the time constant established by the resistances 116 and 118 and capacitance 114, the output of the multi-vibrator will remain positive, because the same pulse is utilized to discharge the timing capacitor 114 back to zero.

The timing capacitor must charge up to slightly over two-thirds the voltage applied before it can drop the output back to zero. Accordingly, the adjustable potentiometer resistance 118 functions as an adjustment of output pulse width during which the multivibrator is cut off. In this manner a predetermined number of pulses per second, produced by operation of the ignition points, are identified in terms of revolutions per minute turning of the engine. As explained hereinafter, the control circuitry functions, above a preselected revolution per minute turning of the engine, to prevent shifting of the transmission.

It is to be pointed out here that the resettable monostable multivibrator is adjustable over an extremely large range, i.e. the time constant may be varied between an extremely short time period, for example less than a millisecond, and a very long time period, for example exceeding one hour. Accordingly, such versatility of operation makes it admirably suited to a wide variety of applications other than the specific control application herein described.

The positive output from the monostable multivibrator is coupled to an edge-triggered RD flip-flop circuit 122. This input signal can be transferred to the output only when a clock pulse, provided by the positive square wave input to the inverter 110 and coupled to the flip-flop circuit through conductor 124, is in a positive going direction. At any other time the output will remain the same, regardless of the input from the multivibrator. If the clock pulse drops to zero before the next input pulse arrives, the input from the multivibrator is always going to be zero at this point in time. However, if the clock pulse rate is faster than the preselected time constant of the multivibrator, then the input to the flip-flop circuit from the multivabrator will remain in the positve condition when the clock pulse comes through, and the output from the flip-flop circuit will be positive. This time rate is adjustable by the potentiometer 118.

It should be noted here that the control circuit pulses may be derived from various means other than the ignition points 96 illustrated. Thus, for example, the pulses may be derived from an alternating current sine wave, from a wide variety of pulse generators, or from various types of transducers which function to convert various physical properties to corresponding electrical signals.

The output control signals from the RD flip-flop circuit 122 are sent to the nand gate 94 where they are compared with the input signals from the interface inverter 92 associated with the one or more events circuits previously mentioned. The nand gate thus may be considered an events controller.

The output from the events controller nand gate is passed through a Schmitt trigger circuit 126 which functions, by establishing a voltage level below which the output is cut off and above which the output is on, to provide protection against temperature instability. The output from the Schmitt trigger circuit is coupled to an emitter follower line driver 128 which provides a low impedance output, a well shaped pulse and a high current, low voltage drive.

The line driver 128 and subsequent circuitry to be described are activated by the sensed signal output from the nand gate, and therefore is termed herein as sensing circuitry. This circuitry may be arranged to function, in response to such sensed signals, to actuate such sensing means as visual or recording meters, lights, alarms, motion controlling devices such as the shifting solenoids described hereinbefore, and others.

Thus, in the embodiment illustrated in FIG. 6, the output from the line driver is coupled to the contacts 46 and 48 of the independently operated switches which control the output drive circuits for the shifting solenoids. In the embodiment illustrated in FIGS. 2 and 6 the dual solenoid arrangement is such that, when both coils 42 and 44 are deenergized the spring-loaded armature returns to a central, neutral position. Accordingly, the hydraulic control valve 26 also is returned to neutral position. Therefore, the position detent assembly normally provided in the control valve and mentioned hereinbefore, is disabled, as by removing the spring-loaded ball. This is done because the solenoid arrangement provides for proper positioning of the valve spool in the three positions of adjustment, and extra power would be required for the solenoids to move the valve spool out of the detents.

For purposes merely of explanation, FIG. 6 also shows a drive circuit for a neutral shift solenoid coil 130. This may be included when the solenoid of FIG. 2 is replaced with a solenoid having three coils, the center one of which functions to drive the control valve to the neutral position.

Since the drive circuits for the forward, neutral and reverse shift solenoid coils are identical, the components thereof are identified by the same reference numerals.

For purposes of this description, let it be assumed that the lift truck is being driven in the forward direction (switch contact 46 being in the broken line position illustrated in FIG. 6) and the operator then wishes to reverse the direction. The operator rocks his foot on the accelerator pedal 18 to pivot the rocker plate 56 counterclockwise from the position illustrated in FIG. 5 to bring the reverse drive reed switch 48 toward its associated magnet 48'. This moves the switch contact 48 to the broken line position in FIG. 6 and returns the switch contact 46 to the full line position.

The transistors 132, 134 and 136 are so biased that the main drive transistor 138 is on all the time. Thus, when the forward motion of the vehicle has been reduced to a predetermined magnitude, as explained hereinbefore, an electric signal from the line drive 128 is coupled through the switch contact 48 to the gate of silicon controlled rectifier 140. This causes the latter to lock up through the reverse shift solenoid coil 44. The latter thus is activated to move the hydraulic control valve 26 to the position in which the shifting cylinder 30 is driven to effect reversing of the transmission 20.

It is to be noted that, by associating the transducer probe 66 with an undriven and unbraked wheel, operation of the sensing and control mechanism of this invention cannot be bypassed or otherwise circumvented by an operator.

When the operator returns the rocker plate 56 of accelerator pedal 18 to the neutral position illustrated in FIG. 5, or pivots the rocker plate clockwise to effect shifting of the transmission to forward drive, and the reverse speed of the vehicle has been reduced to said predetermined magnitude, an electric signal is applied through the inverter transistor 132 to the base of transistor 134, to cut off the latter. This effects cut-off of the lock-up transistor 138 with consequent delatching of the silicon controlled rectifier 140 and deactivation of the reverse shift solenoid coil 44. The control valve 26 thus is moved either to the neutral position, or to the forward drive position, depending upon the position to which the operator has moved the rocker plate.

As explained hereinbefore, when the drive circuits of FIG. 6 are utilized, the detent mechanism commonly provided in the control valve is disabled. In the event it is desired to utilize the detent mechanism, each of the drive circuits illustrated in FIG. 6 may be modified by omitting the silicon controlled rectifier 140 and replacing the NPN transistor 134 with a PNP transistor. In this manner the lock-up transistor 138 is normally off and is turned on only momentarily by a signal from the line drive transistor 128. This momentary energization of the associated control valve solenoid coil functions to move the valve 26 to the appropriate detent position where it is held by the detent mechanism after the solenoid has become deenergized.

It will be appreciated that the solenoids 42, 44 and 130 may be utilized or replaced by other suitable means to activate indicators by which to alert an operator of the attainment of proper conditions at which he may effect manual shifting of the transmission.

The circuitry illustrated in FIG. 6 is constructed conveniently and economically by the use of various integrated circuits available commercially. For example, the components 72, 76, 88 and 90 may be provided by use of integrated circuit Model No. LM 3900 manufactured by National Semiconductor Corp.; the Schmitt trigger circuits 108 and 128 may be provided by integrated circuit Model No SN 7413 manufactured by Texas Instruments; the nand gate 110 by Model SN 7400 and nand gate 94 by Model No. SN 7400, SN 7410, or SN 7440 (depending upon the number of events to be controlled), all manufactured by Texas Instruments, Inc.; and the edge triggered RD flip-flop circuit 122 may be provided by intergrated circuit Model No. SN 7474 manufactured by Texas Instruments, Inc.

With slight modification, the circuitry of FIG. 6 may be utilized to sense and control the motion of other movable devices, such as a conveyor system. Thus, referring to FIG. 7 of the drawings, there is illustrated an elongated main conveyor 150 driven by an electric motor 152 coupled thereto by such means as sprockets 154 and 156 and inter-connecting chain 158. In the embodiment illustrated, the electric motor is of the reversible type, the operation of which is controlled by solenoid coils 42, 44 and 130 illustrated in FIG. 6. The solenoid coils function to control switches contained in the housing 160 and included in the electric circuit of the motor.

Spaced guide rails 162 flank the opposite sides of the main conveyor and are interrupted at intervals to accommodate pivoted gates by which objects P on the main conveyor are directed selectively to a desired one of a plurality of outfeed conveyors. Two such outfeed conveyors 164 and 166 are illustrated, and each is provided with lateral guide rails 168. The gate 170 associated with the upstream side conveyor 164 is shown in open position for diverting objects on the main conveyor to the upstream side conveyor 164, whereas the gate 172 associated with the downstream conveyor 166 is closed.

It will be understood that means is provided for pivoting the gates between open and closed positions. Such means may be operated manually or by a variety of mechanical means controlled remotely, as desired.

Associated with the gates are the previously described switches 46 and 48, respectively. Each of these switches is closed upon opening of the associated gate, as by means of a switch actuator arm 174 movable with the gate.

The noise transducer 62 is mounted on the conveyor system for engagement of the associated probe 66 with the moving main conveyor 150.

In place of the ignition points 96 in FIG. 6 as a source of predetermined controlled signals, any one of a variety of types of electrical pulse generators may be employed. In the embodiment illustrated, a magnetic pulse sending unit 176 is positioned adjacent the drive sprocket 154 on the electric motor 152, the sprocket mounting at least one magnet element adjacent its periphery to activate the sending unit during operation of the motor.

Figure 8:
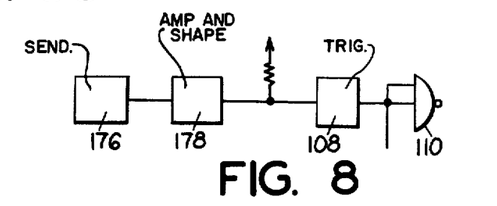
FIG. 8 is a fragmentary schematic diagram showing a modification of the circuitry of FIG. 6 for use with the conveyor system of FIG. 7.

Referring now to FIGS. 6 and 8, the output pulses from the magnetic sending unit 176 are applied to a pulse amplifier and shaper 178, the output of which is coupled to the integrated Schmitt trigger circuit 108 previously described. With this modification, the circuitry of FIG. 6 operates in the manner previously described to sense and control the motion of the main conveyor 150 in the forward direction, by activation of solenoid coil 42, in the reverse direction by activation of solenoid coil 44, and to stop the conveyor by activation of solenoid coil 130.

Thus, for example, in the event objects on the main conveyor collect at the open gate 170, causing the main conveyor speed to be reduced below a predetermined magnitude, the circuitry operates to deenergize the motor and stop the main conveyor.

Figures 10, 11A, 11B, 11C:
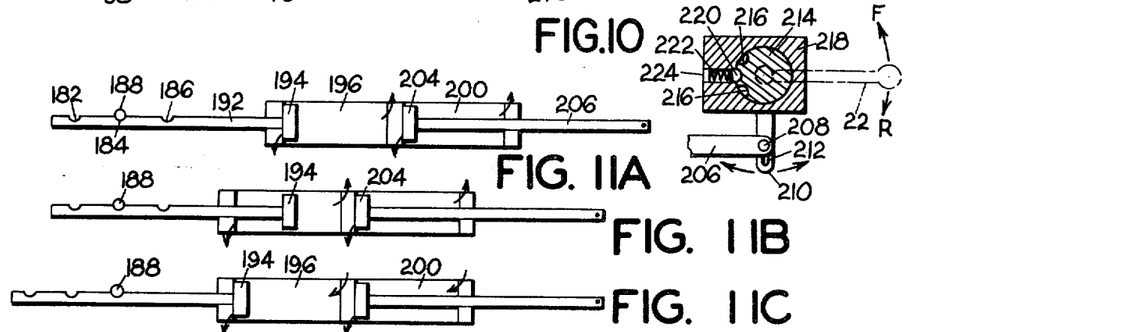
FIG. 10 is a fragmentary sectional view taken on the line 10—10 in FIG. 9.
FIGS. 11a–11e are schematic illustrations of various stages of operation of the fluid pressure control of FIG. 9.
Figures 11D, 11E:
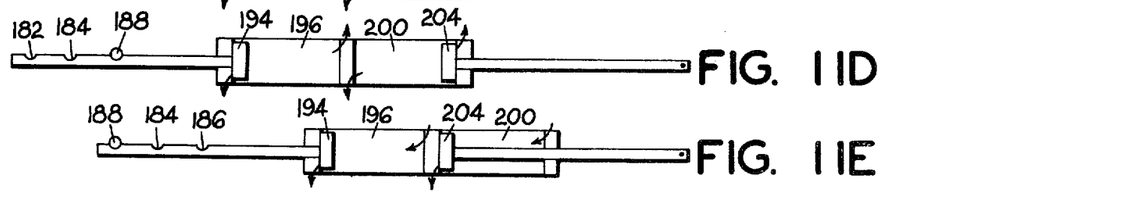
Figure 12:
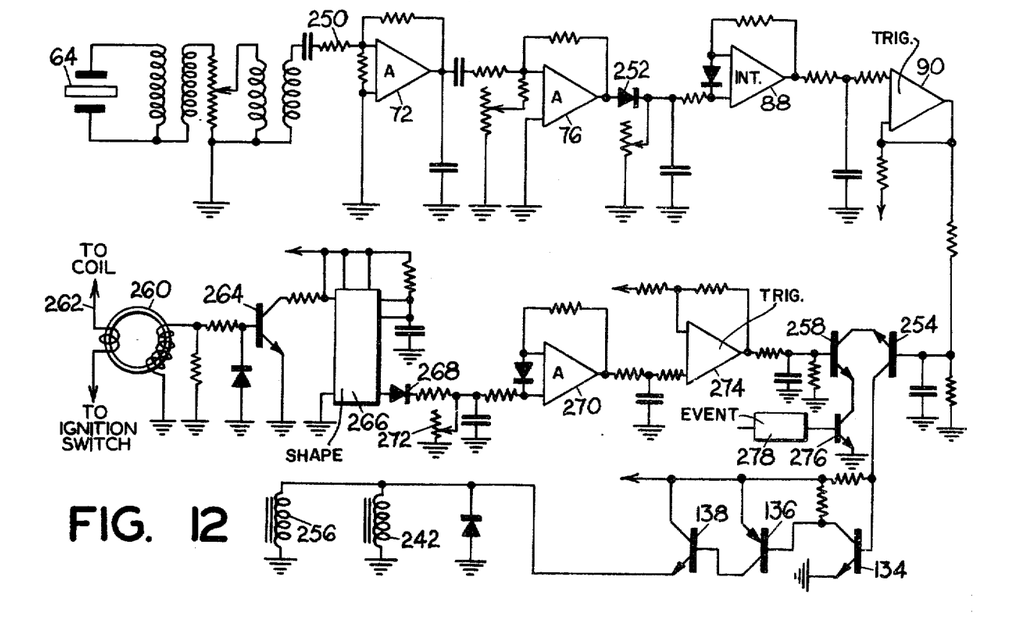
FIG. 12 is a schematic diagram of an electrical circuit for association with the fluid pressure control of FIG. 9.

FIGS. 9–12 illustrate means by which the reversible movements of a lift truck or other movable device are initiated by manual manipulation of a lever, such as shift lever 22 in FIG. 1, and thereafter completed automatically by operation of the motion sensing circuitry of FIG. 12.

FIGS. 11a–11e are schematic illustrations of various movements of the lost motion linkage system of FIG. 9.

Referring first to FIGS. 9 and 10 of the drawings, the spool component 180 of the hydraulic control valve 26 is shown in broken lines to illuate the forward, neutral and reverse detents 182, 184 and 186, respectively, associated detent ball 188 and loading spring 190. The stem 24 connected to the spool projects from the housing of valve 26 and is coupled to the projecting end of a piston rod 192. The opposite end of the piston rod is connected to a piston 194 which is reciprocative within one chamber 196 of a dual chamber cyliner 198. The second chamber 200 of the cylinder is isolated from the first chamber by means of a dividing wall 202, and it confines a second piston 204 for reciprocation therein. A piston rod 206 connected to the second piston projects outwardly through the opposite end wall of the cylinder and its outer end is connected pivotally, as by pivot pin 208, to a lever 210 secured to and projecting laterally from the gear shift level rod 22. The lever 210 is provided with an elongated slot 212 (FIG. 10) through which the pivot pin 208 freely extends, to accommodate pivotal movement of the lever 210 to effect rectilinear movement of the piston rod 206.

Intermediate the ends of the gear shift lever rod 22 is detent mechanism which functions to identify and hold the lever releasably in the forward, neutral and reverse shift positions. Thus, there is secured to the shift rod an enlarged shoulder 214 provided with three circumferentially spaced detents 216. A housing 218 encloses the shoulder and is secured against rotation by connection to a convenient structural member of the vehicle. An opening in the housing confines a detent ball 220 and loading spring 222. The latter is backed by an adjustable set screw 224 by which the compression of the spring may be adjusted. In this regard, this spring is adjusted to provide slightly greater force on the ball than does the loading spring 190 on the valve spool detent ball 188.

The right hand end of cylinder chamber 196 communicates through flexible conduit 230 with a port of a solenoid valve 232. The right hand end of the other cylinder chamber 200 also communicates through a flexible conduit 234 with the same valve port. The valve is provided with an inlet port 236 and an exhaust port 238. In the event the source of fluid pressure is air, the exhaust port merely opens to the atmosphere. If the source of fluid pressure is hydraulic, the exhaust port communicates with a pump sump, as will be understood.

The left hand ends of both cylinder chambers communicate with exhaust ports 240. If the source of fluid pressure is air, these exhaust ports merely open to the atmosphere, whereas if the source of fluid pressure is hydraulic, these exhaust ports are communicated with the sump.

The solenoid valve 232 is actuated by a solenoid 242 controlled by the circuitry in housing 52 and illustrated in FIG. 12. In one position of adjustment the valve communicates the inlet port 236 with the port to which the flexible conduits 230 and 234 are connected. In a second position of adjustment the valve communicates the exhaust port 238 with the port to which the flexible conduits are connected.

It is to be noted here that the flexible conduits 230 and 234 permit rectilinear movement of the cylinder 198 which is supported in floating condition on the piston rods 192 and 206.

As described more fully hereinafter, in connection with the circuitry of FIG. 12, the solenoid 242 is activated to adjust the valve 232 to the position supplying fluid pressure to the right hand ends of both cylinder chambers 196 and 200 when the speed of the lift truck or other movable device has reached a predetermined minimum magnitude. Until such minimum speed has been attained, the valve remains in the position of adjustment in which the right hand ends of the cylinder chambers communicate with the exhaust port 238. In this position of adjustment, the shift lever 22 may be moved to any of the forward, neutral and reverse positions without effecting movement of the valve spool 180. However, with the attainment of said minimum speed and consequent activation of the solenoid 242, the valve is adjusted to the position in which fluid pressure is supplied to the right hand sides of both cylinder chambers. In this condition both pistons are caused to be brought into abutment with the left hand ends of their associated chambers, either by movement of the pistons or by movement of the cylinder relative thereto.

Accordingly, it will be appreciated that the piston-cylinder arrangement described functions as a lost motion linkage when the cylinder chambers are communicated with exhaust, and functions either as a solid interconnection between the shift lever and valve spool, when the cylinder chambers are communicated with the source of fluid pressure.

The foregoing functions of the cylinder assembly are illustrated schematically in FIGS. 11a–11e, as follows: FIG. 11a illustrates the components of the cylinder assembly in the same positions illustrated in FIG. 9; namely, both pistons 194 and 204 abut the left hand ends of their respective cylinder chambers 196 and 200, the valve spool 180 is held in neutral position by the spring loaded detent ball 188, and the shift lever 22 is located in neutral position (FIG. 10).

Assuming that the right hand ends of both cylinder chambers are communicated with exhaust port 238, it is evident that the right hand piston 204 may be moved toward the right freely through its chamber 200, by pivoting the shift lever 22 counterclockwise to the forward position of adjustment (FIG. 10), without changing the neutral position of the valve spool 180. Similarly, if the shift lever is pivoted clockwise to the reverse position of adjustment from the neutral position illustrated in FIG. 11a, the right hand piston 204 will be caused to move toward the left. As illustrated in FIG. 11b, this leftward movement of the right hand piston effects simultaneous leftward movement of the cylinder 198. However, since the right hand ends of both cylinder chambers are communicated with exhaust, the left hand piston 194 is retained in the same position as in FIG. 11a, because of the resilient force of the spool detent ball 188. Accordingly, even though the shift lever has been moved to the reverse position, the valve spool remains in neutral position. Correspondingly, the transmission also remains in neutral position.

Referring now to FIG. 11c, let it be assumed that the speed of the vehicle has been reduced to the predetermined minimum at which the circuitry of FIG. 12 is activated to energize the valve solenoid 242 and switch the valve 232 to the position in which fluid pressure is delivered to the right hand ends of both cylinder chambers 196 and 200. Since the detent ball 220 on the shift lever 22 is loaded by the spring 222 to a greater magnitude than is the valve spool detent ball 188, the application of fluid pressure to the right hand end of the left cylinder chamber 196 forces the left hand piston 194 toward the left from its position in FIG. 11b. The valve spool 180 thus is moved leftward to the position in which the detent ball 188 engages the right hand detent 186. This movement of the valve spool causes hydraulic fluid to be delivered to the hydraulic shift cylinder 30 (FIG. 2) to effect shifting of the transmission to reverse drive condition.

From the foregoing it will be appreciated that the operator of the vehicle or other movable device may preselect a shift condition, by appropriate movement of the shift lever 22, but that the actual shifting of the transmission will not occur until the speed of motion of the vehicle or other movable device has been reduced to the present minimum. At that time, operation of the circuitry of FIG. 12 functions automatically to effect operation of the cylinder assembly to complete the preselected shift.

Let it now be assumed that the operator decides to pre-select a forward drive condition while the vehicle or other movable device is moving in the reverse at a speed greater than the predetermined minimum speed. Referring To FIG. 11d, the operator pivots the shift lever 22 counterclockwise from the reverse position to the forward position (FIG. 10). This shifting of the lever results in simultaneous movement of the right hand piston 204 toward the right from the position illustrated in FIG. 11c to the position illustrated in FIG. 11d. However, since the right hand ends of both cylinder chambers are communicated with exhaust port 238, said rightward movement of the piston is not accompanied by any movement of the cylinder 198 or valve spool 180.

With the shift lever 22 thus preset to the forward drive condition, let it now be assumed that the speed of the reverse movement is decreased to the preset minimum. Operation of the control circuitry of FIG. 12 thus activates the valve solenoid 242 to switch the valve 232 to the position in which fluid pressure is delivered to the right hand ends of both cylinder chambers (FIG. 11e). Since the shift detent ball 220 is loaded by the spring 222 to a greater magnitude than is the valve spool detent ball 188, the fluid pressure supplied to the right hand end of the right hand cylinder chamber 200 causes the cylinder 198 to be moved toward the right from the FIG. 11d position until the right hand piston 204 abuts the left hand end of its chamber. This rightward movement of the cylinder 198 effects corresponding rightward movement of left hand piston 194 and therefore the valve spool 180, to the position in which the detent ball 188 engages the left hand detent 182. The valve 26 thus is adjusted to the position in which hydraulic fluid is delivered to the shift cylinder 30 to switch the transmission 20 to forward drive.

Referring now to FIG. 12, the alternating current voltage signals from the transducer 64 are passed through line load resistance 250 to convert them to currents, as previously described. These currents are amplified by high band pass amplifier 72 and then by band pass amplifier 76. This provides a center frequency of operation that is essentially the same as the input transducer. This output is connected through a diode 252 to direct current integrator amplifier 88. The varying direct current voltage delivered to the amplifier is directly proportional to the noise generated by the transducer. Thus, by this means of minimizing extraneous noises, the system is usable effectively to sense and control motion of devices which, because of environment or other factors, either generate, or are otherwise in close proximity to, excessive amounts of noises which might otherwise cause false triggering of the circuitry.

The output from the amplifier 88 this is a direct current voltage which represents the magnitude of motion of the device. This output voltage is applied to Schmitt trigger 90 the output of which is connected to and circuit transistor 254. The output of this transistor functions to drive the shift solenoid 242 through the transistors 134, 136 and 138, in the same manner as previously described.

If desired, a second solenoid 256 also may be driven by the foregoing drive circuit. This solenoid may, for example, operate a recording instrument, or other monitor by which to provide visual or recorded evidence of operation of the movable device.

The and circuit also includes a second transistor 258 which is responsive to predetermined control signals, in manner analogous to the nand gate 94 described hereinbefore. In the embodiment illustrated in FIG. 12, the source of predetermined control signals involves the ignition circuit of a lift truck engine, as in FIG. 6. However, in FIG. 12 a ferrite core 260 is coupled to the electrical conductor 262 interconnecting the ignition coil and the ignition switch. The current flow resulting from closing of the ignition points thus is coupled through the ferrite core and the amplifier transistor 264 to the integrated circuit 266 wherein it is shaped to a specific size pulse. In this regard, it will be understood that operation of the ignition system involves dwell time which produces output pulses of varying width, inversely proportion to engine speed. However, the difference of these pulse widths with respect to time and numbers, is very small when averaged. This average output pulse is applied to the shaper circuit 266 which has a specific time duration. Accordingly, the output pulses from the shaper circuit are of constant width, regardless of engine speed.

The constant width output pulses are rectified, by diode 268, to provide a direct current averaging voltage for the number of pulses. This voltage is delivered to a direct current amplifier 220. Rheostat 272 affords adjustment by which the shift lockout solenoid 242 is activated at a desired magnitude of engine speed.

The output from the amplifier 220 is fed to a Schmitt trigger circuit 274, the output of which is connected to the and transistor 258.

Accordingly, in order for the shifting lockout solenoid 242 to be activated, there must be signals applied to both transistors 254 and 258, one signal being derived by transducer 64 and the other signal being derived by the engine ignition system. If either of these signals is not present, the shifting solenoid cannot be activated.

As in the circuit of FIG. 6, the circuit of FIG. 12 may also be expanded to accommodate the inclusion of one or more additional events to be controlled. Thus, additional transistors, such as transistor 276 illustrated, may be connected in series with the series transistors 254 and 258, with the base of each transistor arranged to receive a control signal derived from a desired event source 278, in the same manner as the transistor 258 receives control signals from the ignition system. For example, the transistor 276 may be arranged to receive a control signal representing a predetermined maximum temperature of engine oil or coolant, a predetermined minimum engine oil pressure, a predetermined minimum cooling fan speed, or others. By this means the vehicle is rendered inoperative when any one of the events included in the circuitry reaches a condition beyond pre-set limits.

From the foregoing it will be appreciated that the present invention provides a novel method for the sensing and control of motion of a movable member by apparatus which is of simplified construction for economical manufacture, which is precise in its operation over an extremely wide range of predetermined speeds, and which is versatile in its application to the sensing and control of a wide variety of types of motions. For example, it may be used to control the correlation of linear speed of movement of a lathe cutting tool with the rotational speed of the work. Further, the resettable monnostable multivibrator circuit incorporated therein has additional utility in a multiplicity of diverse applications in which the functions of a multivibrator are desired. Additionally, the lost motion linkage system has additional utility in a multiplicity of applications in which lost motion functions are required.

It will be apparent to those skilled in the art that various changes may be made in the method steps and in the size, shape, type, number and arrangement of parts of the apparatus described hereinbefore. For example, appropriate modifications of the circuitry associated with the nand gate 94 and the transistors 254 and 258 may be made to provide a variety of signal matching conditions. Thus, the compared motion and control signals may be in a matched condition, to produce an output sensing signal, when they have a predetermined but not necessarily the same magnitude, polarity, or other physical characteristic. These and other modifications and changes may be made without departing from the spirit of this invention.

Having thus described out invention and the manner in which it may be used, we claim:

1. The method of sensing a predetermined motion of a movable member, comprising:
   a. engaging the movable member with a transducer capable of converting noise signals to electric alternating current signals,
   b. utilizing the electric alternating current signals to produce direct current motion signals proportional to the magnitude of motion of the movable member,
   c. producing direct current control signals representing a predetermine condition of the movable member,
   d. comparing the motion signals and control signals, and
   e. utilizing said compared signals to produce a constant output electric sensing signal when said compared signals are matched, the magnitude of the output electric sensing signal being independent of the difference between the motion and control signals.

2. The method of claim 1 wherein the transducer is capable of converting noise signals to alternating current voltage signals, and including the step of converting the alternating current voltage signals to current signals proportional to the noise signals generated by the transducer.

3. The method of claimm 1 for controlling the motion of a movable member having motion controlling means operable by an electrical operator device, the method including the step of utilizing said output electric sensing signal to effect actuation of the electrical operator device.

4. The method of claim 3 wherein said movable member is a vehicle having a motion controlling transmission operable by the electrical operator device.

5. Apparatus for sensing a predetermined motion of a movable member, comprising:
   a. a transducer capable of converting noise signals to electric alternating current signals,
   b. means mounting the transducer for engagement with the movable member,
   c. electric direct current motion signal generating means having an input connected to the output of the transducer and operable by the alternating current output signals of the transducer to produce direct current motion signals proportional to the magnitude of motion of the movable member,
   d. electric direct current signal generating means for producing direct current control signals representing a predetermined condition of the movable member,
   e. electric sensing signal generating means having an input connected to the outputs of the direct current motion and control signal generating means and capable of producing a constant electric output sensing signal when the motion and control signals are matched, the magnitude of the output sensing signal being independent of the difference between the motion and control signals, and
   f. electrical sensing means connected to the output of the electric sensing signal generating means for actuation by the electric output sensing signal.

6. The apparatus of claim 5 wherein the transducer output is alternating current voltage signals and the motion signal generating means includes circuit means for converting said voltage signals to current signals.

7. The apparatus of claim 5 for controlling the motion of a movable member having electrically operated motion controlling means, and in which apparatus the electrical sensing means includes electrical operator means connected to the motion controlling means and operable by the electric output sensing signal to operate the motion controlling means.

8. The apparatus of claim 7 wherein:
   a. the electrical operator means comprises a pair of electrical solenoids one for forward motion and the other for reverse motion of the movable member,
   b. a forward switch connects the output of the sensing signal generating means selectively to the forward solenoid, and
   c. a reverse switch connects the output of the sensing signal generating means selectively to the reverse solenoid.

* * * * *